United States Patent
Bennett et al.

(10) Patent No.: US 7,000,526 B2
(45) Date of Patent: Feb. 21, 2006

(54) HYDRAULIC PISTON MADE FROM ROLLED SHEET METAL, METHOD FOR ITS MANUFACTURE AND INTERMEDIATE PRODUCT OF THE METHOD

(75) Inventors: Scott Woodward Bennett, Heide Park, UT (US); Vladimir Grigorievich Geller, St. Petersburg (RU); Elkin Nikolai Michailovich, St. Petersburg (RU)

(73) Assignee: Lucas Automotive GmbH, (DE)

( * ) Notice: Subject to any disclaimer, the term of this patent is extended or adjusted under 35 U.S.C. 154(b) by 0 days.

(21) Appl. No.: 10/767,832

(22) Filed: Jan. 29, 2004

(65) Prior Publication Data

US 2004/0216604 A1    Nov. 4, 2004

Related U.S. Application Data

(63) Continuation of application No. PCT/EP02/08887, filed on Aug. 8, 2002.

(30) Foreign Application Priority Data

Aug. 8, 2001    (RU)    ................ 2001122026

(51) Int. Cl.
*F16J 1/04*    (2006.01)

(52) U.S. Cl. .................. 92/208; 92/172; 29/888.04; 29/888.044

(58) Field of Classification Search ............ 29/888.04, 29/888.049; 92/172, 208
See application file for complete search history.

(56) References Cited

U.S. PATENT DOCUMENTS

| | | | | |
|---|---|---|---|---|
| 1,317,055 A | * | 9/1919 | Townsend et al. ....... | 29/888.04 |
| 3,150,570 A | * | 9/1964 | Johnson et al. ........... | 92/172 |
| 3,476,221 A | * | 11/1969 | Schanz ..................... | 92/172 |
| 3,532,030 A | * | 10/1970 | Margetts .................. | 92/208 |
| 5,231,916 A | | 8/1993 | Weiler | |

FOREIGN PATENT DOCUMENTS

| | | |
|---|---|---|
| DE | 38 34 420 | 4/1990 |
| FR | 1 464 559 | 11/1966 |
| GB | 1169251 | 11/1969 |
| JP | 56-90130 | 7/1981 |
| JP | 61-269938 | 11/1986 |
| JP | 1-91930 | 4/1989 |
| JP | 2-120536 | 5/1990 |
| JP | 3-151123 | 6/1991 |
| RU | 2 163 987 | 3/2001 |
| RU | 2 167 733 | 5/2001 |
| WO | 91/12445 | 8/1991 |

* cited by examiner

*Primary Examiner*—F. Daniel Lopez
(74) *Attorney, Agent, or Firm*—MacMillan, Sobanski & Todd, LLC (57) ABSTRACT

The invention relates to a cup-shaped hydraulic piston (10) made from rolled sheet metal, which comprises an open end (12), a side wall (16) with a cylindrical outer surface (18) and an inner surface (22), as well as a piston head (14). The side wall (16) at its outer surface (18) is provided with an annular groove (20) in a portion adjoining the open end (12). To ensure a lightweight style of construction combining high stability with ease of manufacture, the part of the inner surface (22) adjoining the open end (12) and extending axially over the annular groove (20) has a cylindrical shape, and the thickness of the side wall (16) decreases monotonically from the portion (24) of the inner surface (22) up to the piston head (14).

15 Claims, 6 Drawing Sheets

HYDRAULIC PISTON MADE FROM ROLLED SHEET METAL, METHOD FOR ITS MANUFACTURE AND INTERMEDIATE PRODUCT OF THE METHOD

CROSS REFERENCE TO RELATED APPLICATIONS

This application is a continuation of International Application No. PCT/EP02/08887 filed Aug. 8, 2002, the disclosures of which are incorporated herein by reference, which claims priority to Russian Patent Application No. 2001-122026 filed Aug. 8, 2001, the disclosures of which are incorporated herein by reference.

BACKGROUND OF THE INVENTION

The invention relates to a hydraulic piston made from rolled sheet metal, to a method of manufacturing such a piston and to a blank forming an intermediate product of said method. Pistons of this type are used e.g. in hydraulically actuated vehicle brakes.

Pistons of the described type have to satisfy mutually conflicting requirements: on the one hand, they are to be light so as to have a low inertia, on the other hand, they have to be stable enough to prevent radial deformation of the side wall of the piston in the event of the base of the piston being subjected to a high load, such as occurs e.g. during a powerful braking operation because of the high hydraulic pressure in the brake system. If the last condition is not met, a total loss of function of the piston may occur.

Hydraulic pistons usually have the shape of a cylindrical cup with an open end. In a portion of the outer surface of the side wall adjoining the open end of the piston there is often an annular groove, which is used to fasten a protective sleeve. The region of the annular groove is particularly at risk of load-induced material deformation because the wall is weakened by the groove.

From WO 91/12445, and corresponding U.S. Pat. No. 5,231,916, both of which are incorporated by reference herein, a piston manufactured by a drawing method is known, in which the wall thickness in the critical groove region is not smaller than the wall thickness in the other regions of the piston. Two critical regions are mentioned in WO 91/12445, namely, on the one hand, the region of the groove and, on the other hand, the inner region of a spring arrangement. The stability requirements in these two regions determine the thickness of the piston wall.

From the Russian patent 2 163 987 a drawing method for piston manufacture is known, which enables a piston to be manufactured with a stable, yet thin wall. The piston is a hollow structure with an open end. Its outer wall is cylindrical in shape and has a groove for fastening a protective sleeve. The inner surface of the piston is cylindrical in a region adjoining the open end and extending in axial direction internally over the annular groove. In a further inward lying portion of the piston the inside diameter is greater than in the region adjoining the open end. Consequently, the thickness of the side wall is greater at the open end than in the vicinity of the piston head, this being beneficial in terms of the ability to withstand axial forces in the critical region of the groove. It is however complicated to manufacture such a piston having two inner surfaces of differing inside diameter and identical outside diameter, especially as the inner surface with the smaller inside diameter lies at the open end of the piston.

SUMMARY OF THE INVENTION

The underlying object of the invention is to provide a hydraulic piston, which combines high stability with a low weight and at the open end has a wall thickness sufficient to guarantee the problem-free transmission of axial forces. The piston is moreover to be easy to manufacture. A further object is to indicate an intermediate product that arises within the framework of manufacture of the hydraulic piston.

In contrast to cylindrical hydraulic pistons known from the prior art, the thickness of the side wall of the piston decreases monotonically from the part of the inner surface of the side wall adjoining the open end and having a cylindrical shape, to the piston head. In other words, from the cylindrically shaped portion of the inner surface of the side wall to the piston head the inside diameter of the hydraulic piston according to the invention increases monotonically. Here, by the term "monotonic" is meant, in particular, a continuous decrease of the side wall thickness and/or a continuous increase of the inside diameter. A piston thus configured presents excellent stability with regard to the required types of load and is moreover easy to manufacture.

According to a preferred embodiment, the piston head is curved inwards, in particular in a concave manner. Such a curvature of the piston head guarantees a good ability to withstand the usual working loads.

Preferably, when the piston head is curved inwards, the radially outer part of the piston head has the shape of a truncated cone and the central or middle part of the piston head has the shape of a spherical cap. The extension of the truncated-cone-shaped part of the piston head along its profile is in said case preferably not greater than three times the wall thickness of the side wall in its portion adjoining the piston head. A partly truncated-cone-shaped, partly spherical-cap-shaped configuration of the piston head is particularly advantageous for the shaping, by stamping, of the outer surface of the side wall in the region of transition of the side wall to the piston head.

The manufacturing method according to the invention, in its simplest form of implementation, comprises the steps of punching a disk-shaped round blank out of a piece of rolled sheet metal, deep-drawing the disk-shaped round blank into a cup shape by means of a bottom die and a punch, stamping the cup-shaped blank to form the piston head and the cylindrical outer surface of the hydraulic piston, and incorporating an annular groove into the outer surface of the hydraulic piston. It is apparent that the manufacturing method according to the invention entails only very little cutting, e.g. for producing the annular groove. In principle, the piston is however manufactured from a rolled sheet metal by drawing and stamping operations.

In preferred developments of the manufacturing method according to the invention, the deep-drawing is effected in a plurality of steps. According to an embodiment, the disk-shaped round blank is pressed firstly by means of a first punch through a first circular die opening and then by means of a second punch through a second circular die opening, the diameter of which is smaller than the diameter of the first die opening. In the first deep-drawing step a still relatively flat, cup-shaped blank is obtained, the inside diameter of which corresponds to the outside diameter of the punch used. As a result of the reshaping of material, the thickness of the sheet metal varies. After the deep-drawing step this thickness is greater at the open end than in a transition region between side wall and head since because of the drawing operation the material thickness decreases there. The wall thickness reduction from the open end to the transition region between side wall and head occurs continuously. As a result of the second deep-drawing step the cup shape becomes narrower and higher and a further reduction of the wall thickness occurs in the region of transition from the side wall to the head. The inside diameter of the cup-shaped blank after the second deep-drawing step is determined by the outside diameter of the punch used in the second deep-drawing step. Preferably, the punches used in the first and in the second deep-drawing step are cylindrical.

According to a particularly preferred development of the method according to the invention, the cup-shaped blank is pressed by means of a third punch through a third circular die opening, the diameter of which is smaller than the diameter of the second die opening, wherein the third punch has a first cylindrical portion emanating from its free end and adjoined by a second cylindrical portion, the diameter of which is greater than the diameter of the first cylindrical portion and smaller than the diameter of the third die opening. By means of this third deep-drawing step, firstly, the diameter-to-height ratio of the cup-shaped blank is altered further in the direction of the desired final shape, wherein a further decrease of the wall thickness in the transition region between the side wall and the piston head occurs, and, secondly, in the vicinity of the open end of the blank there is formed in the side wall an inner step, which is very advantageous for subsequent machining steps.

The step in the inner surface is preferably used, after deep drawing into a cup shape, to form an inwardly curved piston head by means of a first stamping operation in that a step-shaped punch comes into engagement with the step in the side wall of the blank and presses the blank into a bottom forming die.

This first stamping operation is preferably followed by a fourth deep-drawing step, in which the cup-shaped blank is pressed once more by means of a step-shaped punch, which comes into engagement with the step in the side wall of the blank, through a fourth circular die opening, the diameter of which is smaller than the diameter of the third die opening. In this fourth drawing step the cylindrical outer surface of the side wall is formed.

According to a particularly preferred development of the method according to the invention, subsequent to forming of the cylindrical outer surface of the side wall a second stamping operation is effected by means of a bottom forming die and a step-shaped punch, which comes into engagement with the step in the side wall of the blank, in order to form a transition region between the piston head and the side wall. In said case, the region of the bottom die touching the piston head is advantageously cap-shaped in the centre and truncated-cone-shaped at the edge.

Forming of the transition region between the piston head and the side wall is preferably followed by a third stamping operation by means of a bottom forming die and a, once more, step-shaped punch, which comes into engagement with the step in the side wall of the blank, in order to lend the piston head its final configuration.

After forming of the annular groove, at least the outer surface may be subsequently machined. The subsequent machining of the outer surface may comprise one or more steps. The subsequent machining preferably comprises at least one of the steps: grinding, coating and polishing.

An intermediate product according to the invention, which arises within the framework of manufacture of the hydraulic piston, is manufactured by punching a disk-shaped round blank out of a piece of rolled sheet metal, by deep-drawing the disk-shaped round blank into a cup shape using a bottom die and a punch, as well as by stamping the cup-shaped blank to form the piston head and the cylindrical outer surface of the hydraulic piston.

DETAILED DESCRIPTION OF THE INVENTION

Figure 1:
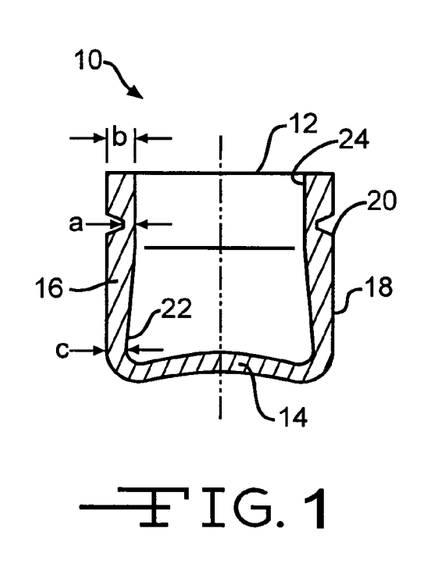
FIG. 1 a first embodiment of a hydraulic piston according to the invention in longitudinal section, FIG. 2 a deep-drawing step effected in the framework of manufacture of the piston of FIG. 1, FIG. 3 a stamping step effected in the framework of manufacture of the piston of FIG. 1, FIG. 4 a punching step during manufacture of the piston of FIG. 13, FIG. 5 a first deep-drawing step during manufacture of the piston of FIG. 13, FIG. 6 a second deep-drawing step during manufacture of the piston of FIG. 13, FIG. 7 a third deep-drawing step during manufacture of the piston of FIG. 13, FIG. 8 a first stamping step during manufacture of the piston of FIG. 13, FIG. 9 a fourth deep-drawing step during manufacture of the piston of FIG. 13, FIG. 10 a second stamping step during manufacture of the piston of FIG. 13, FIG. 11 a third stamping step during manufacture of the piston of FIG. 13, FIG. 12 an almost finished piston in longitudinal section, and FIG. 13 a second embodiment of a hydraulic piston according to the invention in longitudinal section.

FIG. 1 shows a first embodiment of a hydraulic piston 10 for a hydraulic brake of a motor vehicle in longitudinal section. The piston 10 is hollow and has an open end 12. It comprises a piston head 14, which is integrally connected to a side wall 16.

The side wall 16 has a cylindrical outer surface 18, let into which is an annular groove 20, which is situated in an end portion of the side wall 16 adjacent to the open end 12.

The side wall 16 further has an inner surface 22, which is cylindrical in a region 24 adjoining the open end 12 and extending axially over the annular groove 20. From the end of this region 24 to the piston head 14 the thickness of the side wall 16 continuously decreases, while the cylindrical outer shape is retained.

The dimensions of the hydraulic piston 10 may be selected in accordance with the intended application. The piston 10 may be, for example, 50.5 mm high and designed for an operating pressure of at least 160 bar. The wall thicknesses a, b and c are then so selected that the piston 10 particularly in the region of the annular groove 20 is stable under axial loads without increasing an optimum wall thickness c, which ensures a resistance to both axial thrust forces and radial compressive forces. For the described piston size, the dimension a may be e.g. 1.9 mm, the dimension b 3.9 mm and the dimension c 3 mm. Starting from the open end 12, the cylindrical region 24 of the inner surface 22 extends approximately 16 mm in axial direction. The region of the continuous wall thickness reduction then extends over a total of 31 mm in axial direction.

Figure 2:
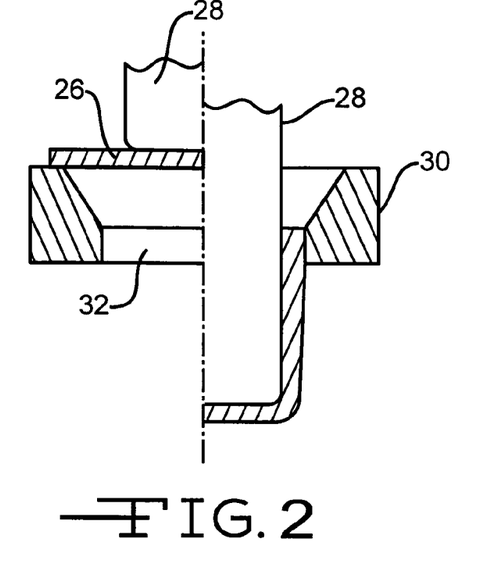

FIG. 2 illustrates a deep-drawing step for manufacture of the piston 10. Before this deep-drawing step, a disk-shaped round blank 26 is punched out (not shown) of rolled sheet metal. This blank 26 is pressed by means of a cylindrical punch 28 through a bottom die 30 having a circular die opening 32. The dimension b is defined by the clearance between the punch 28 and the bottom die 30. FIG. 2 shows, in the left half, the initial state and, in the right half, the state after effecting the deep-drawing step. The decrease of the wall thickness of the side wall 16 from the open end 12 in the direction of the piston head 14 is apparent. In this state the outer surface 18 of the side wall 16 still does not have a cylindrical shape.

The deep-drawing step illustrated in FIG. 2 need not be effected all at once but may be divided into a plurality of deep-drawing steps. In a first deep-drawing step, then, a still relatively flat and wide cup-shaped blank 26 is first produced, which in subsequent deep-drawing steps becomes progressively narrower and higher in order to come closer and closer to the ultimately desired shape.

Figure 3:
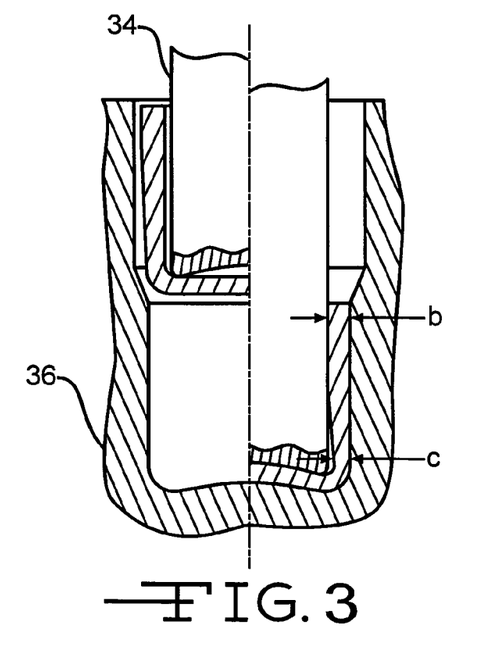

FIG. 3 shows a subsequent stamping step, in which the now cup-shaped blank 26 is pressed by means of a further punch 34 into a further bottom die 36 in order to lend the outer surface 18 the cylindrical shape and the piston head 14 an inwardly curved shape. To achieve this, the punch 34 has a concave end face and the bottom die 36 has a convex base. By means of the stamping step shown in FIG. 3 the outer surface 18 and the piston head 14 are simultaneously brought into the desired shape.

Figure 13:
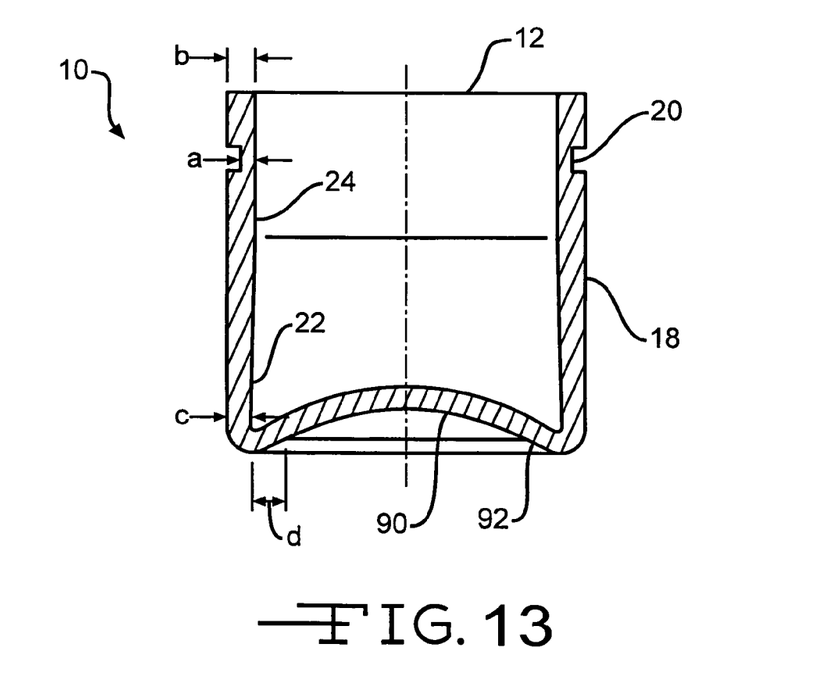

FIG. 13 shows a second embodiment of a hydraulic piston 10, which differs from the embodiment illustrated in FIG. 1 in that the piston head 14 in its middle region is spherical-cap-shaped and in a radially outer region is truncated-cone-shaped.

FIGS. 4 to 11 show a method that is eminently suitable for manufacturing the piston of FIG. 13. Each of FIGS. 4 to 11 shows, on the left, an initial state and, on the right, the state reached on completion of the respective machining step.

Figure 4:
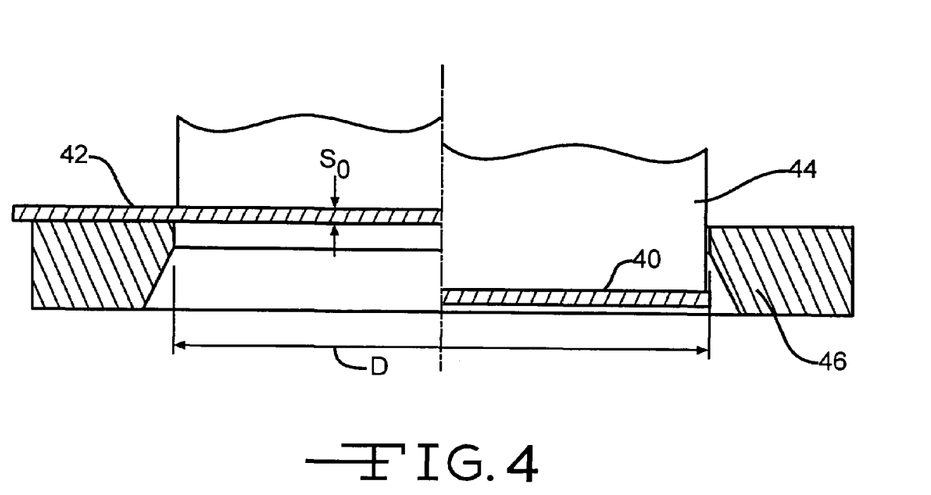

FIG. 4 firstly shows a punching step, in which a disk-shaped, round blank 40 is punched by means of a punch 44 and a bottom die 46 out of a rolled sheet metal 42 of the quality 08Yu and in the present case has a thickness $S_0$ of 3.6 mm and a diameter D of 124 mm.

Figure 5:
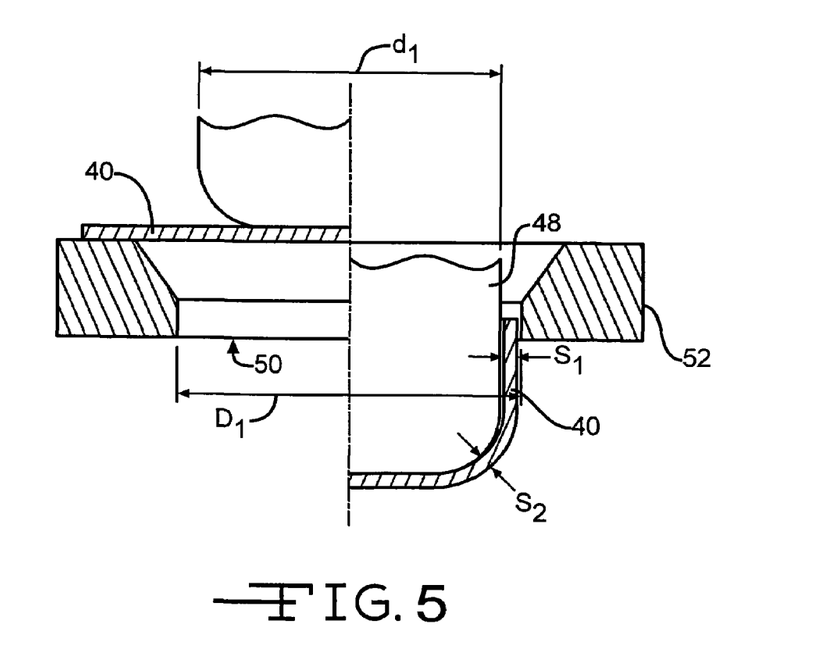

FIG. 5 shows a first deep-drawing step, in which the disk-shaped blank 40 is pressed by means of a first punch 48 through a first circular die opening 50 of a bottom die 52 and hence formed into a cup shape. In the present case, the first punch 48 has a diameter $d_1$ of 72 mm, while the first die opening 50 has a diameter $D_1$ of 80 mm. The outside diameter of the now cup-shaped blank 40 at its open end is therefore 80 mm and the wall thickness $S_1$ in the region of its open end is 4 mm. As a result of the drawing operation the wall thickness decreases continuously in the direction of the head until it reaches a value $S_2$ of approximately 3.5 mm in the transition region between the side wall and the head.

Figure 6:
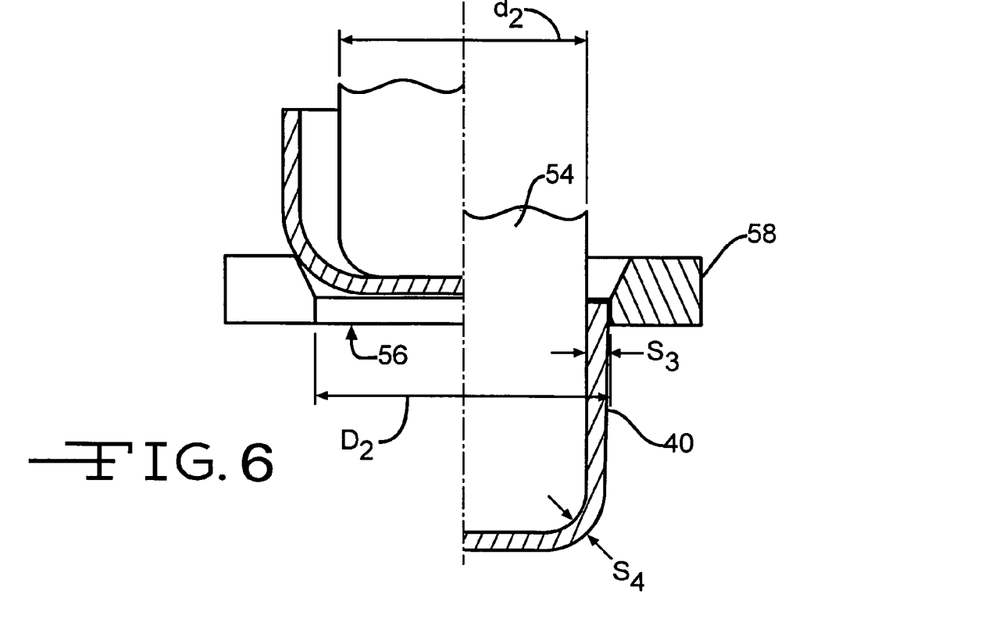

FIG. 6 shows a second deep-drawing step, in which the blank 40 is brought from an outside diameter of 80 mm to an outside diameter of 65 mm in that a second cylindrical punch 54 presses the cup-shaped blank 40 through a second circular die opening 56 of a bottom die 58. The outside diameter $d_2$ of the second punch 54 is 57 mm, while the diameter $D_2$ of the second die opening 56 is 65 mm. By means of this deep-drawing step a cup-shaped blank 40 is obtained, which has an inside diameter of 57 mm and an outside diameter that decreases from 65 mm at the open end continuously in the direction of the head. The thickness of the side wall accordingly decreases from a value $S_3$ of 4 mm to a value $S_4$ of 3.45 mm in the region of the transition between the side wall and the head.

Figure 7:
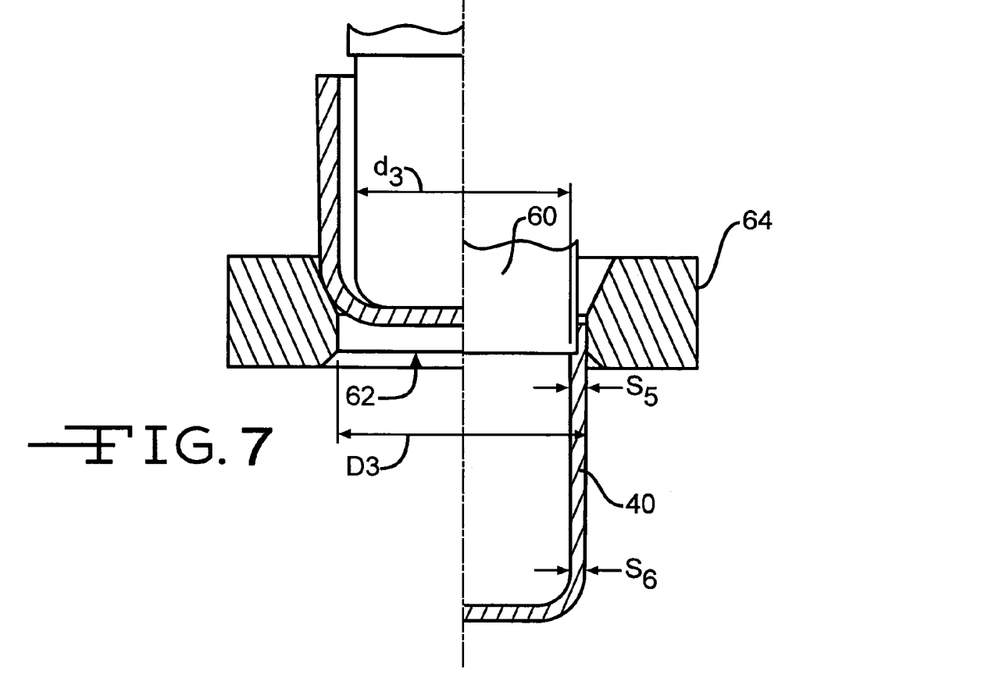

FIG. 7 shows a third deep-drawing step, in which the cup-shaped blank 40 is brought from an outside diameter of 65 mm to an outside diameter of 56.5 mm in that a third cylindrical punch 60 presses the blank 40 through a third circular die opening 62 of a bottom die 64. The outside diameter $d_3$ of the third punch 60 is 48.6 mm, while the diameter $D_3$ of the third die opening 62 is 56.5 mm. Once more, as a result of the drawing operation the wall thickness of the side wall of the blank 40 decreases in the direction of its head, close to the open end of the blank 40 said wall thickness is defined by the clearance between the side wall and the bottom die 64 and has a value $S_5$ of 3.95 mm, while close to the head it has a value $S_6$ of 3.4 mm. As is apparent from FIG. 7, the third punch 60 comprises a first cylindrical portion, which forms its free end and has the already mentioned outside diameter $d_3$ of 48.6 mm, and an adjoining, second cylindrical portion having an outside diameter of 53 mm. At the end of the third deep-drawing step this second, larger-diameter portion of the third punch 60 forms a step 41 (see FIG. 12) in the inner surface of the side wall of the blank 40 by reducing the thickness of the side wall close to the open end. The radial extension of the formed step is 2.2 mm.

Figure 8:
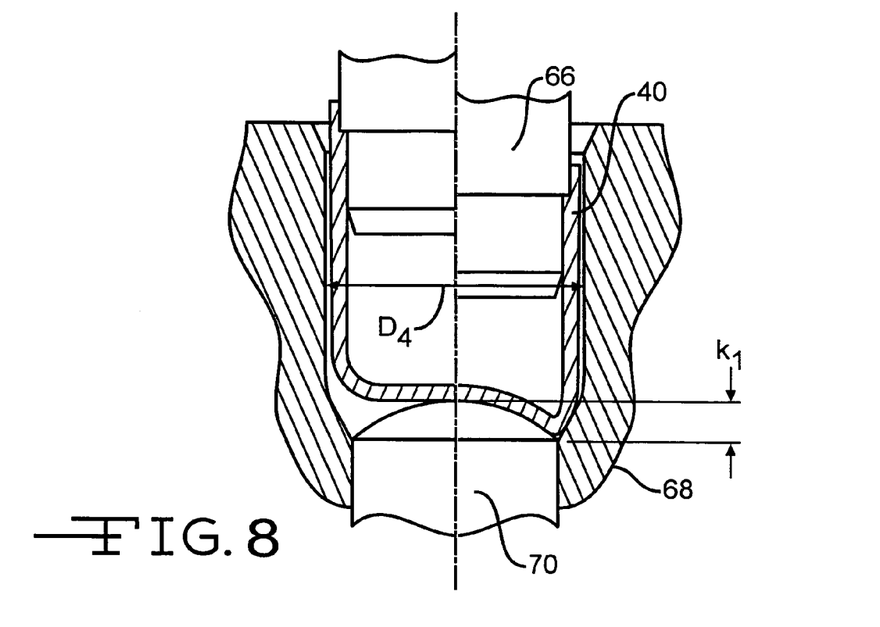

FIG. 8 shows a first stamping step, in the course of which the head of the blank 40 is curved inwards. For this purpose, a step-shaped punch 66 of a complementary design to the inner surface of the blank 40 presses the blank 40 into a bottom forming die 68 in that the punch 66 comes into engagement with the step 41 formed in the side wall of the blank 40. The inside diameter $D_4$ of the forming die opening is 56.5 mm, with the result that the outside diameter of the blank 40 is not further reduced by said opening. The base of the forming die opening is formed by a punch-shaped ejector 70, of which the surface facing the blank 40 is spherical-cap-shaped. Thus, the head of the blank 40 is deformed inwards to a concavity $k_1$ of 8 mm. In said case, the part of the side wall adjacent to the head is drawn slightly radially inwards.

Figure 9:
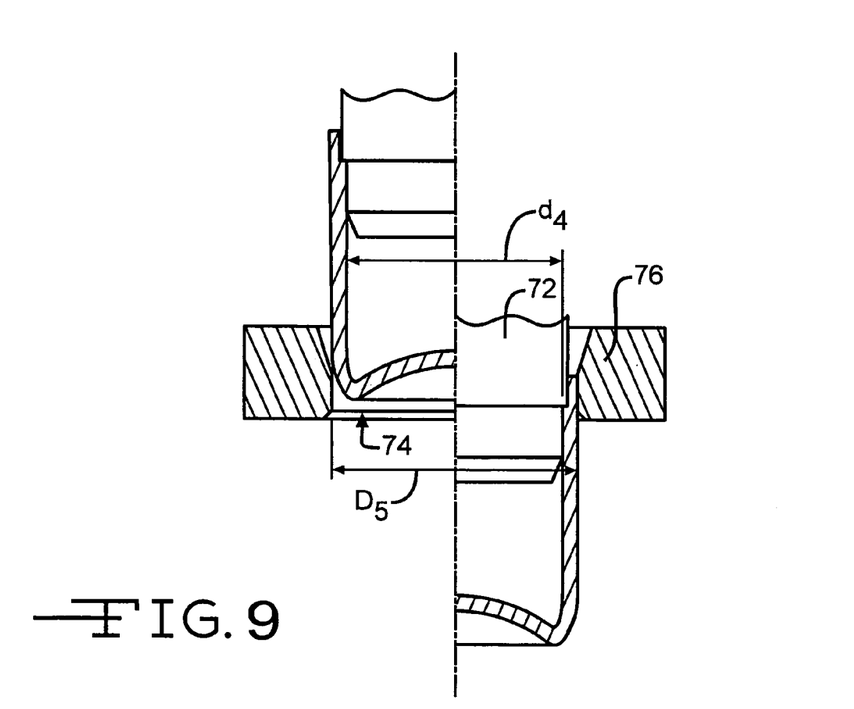

FIG. 9 shows a fourth deep-drawing step, in which the outside diameter of the blank 40 is brought from 56.5 mm to 54.3 mm in that a step-shaped punch 72, which comes into engagement with the step 41 formed on the inner surface of the blank 40, presses the blank 40 through a fourth circular die opening 74 of a bottom die 76. A first cylindrical portion forming the free end of the punch 72 in said case has an outside diameter $d_4$ of 46.4 mm, while the fourth die opening 74 has a diameter $D_5$ of 54.3 mm. By means of this fourth deep-drawing step the outer surface of the side wall of the blank 40 is formed into a cylinder having a diameter of 54.3 mm. Because of the cylindrical portion having the diameter $d_4$ and forming the free end of the punch 72, the inner surface of the blank 40 also remains cylindrical in this region. In the adjoining region the inside diameter of the blank 40 increases continuously as far as the head, because the wall thickness of the side wall decreases continuously.

Figure 10:
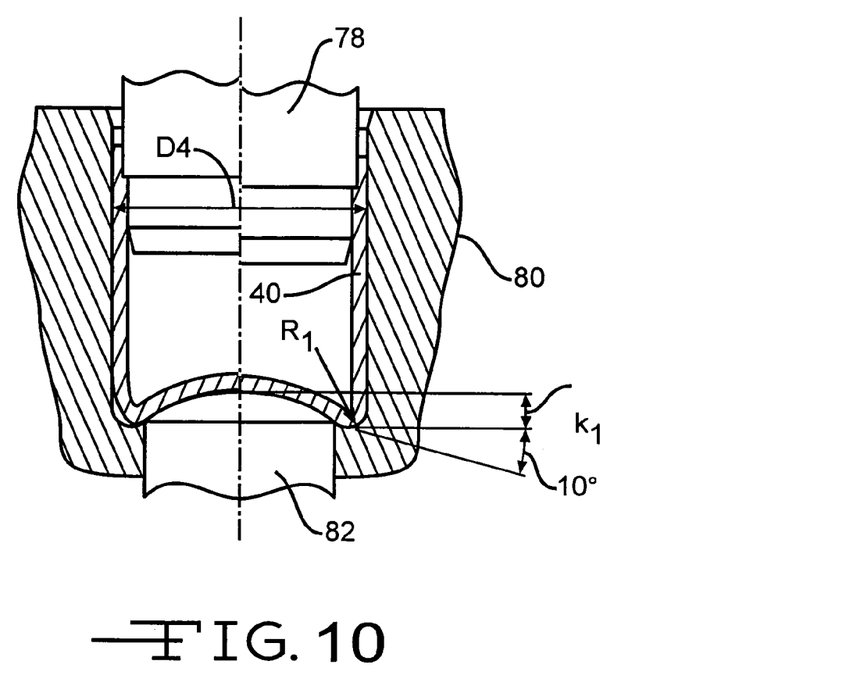

FIG. 10 shows a second stamping step, in which the transition region between the side wall and the head of the blank is formed. For this purpose, a likewise step-shaped punch 78 by coming into engagement with the shoulder 41 provided on the inner surface of the blank 40 presses the blank 40 into the opening of a bottom forming die 80, the base of which is formed by a punch-like ejector 82. The surface of the ejector 82 facing the blank 40 is spherical-cap-shaped in the centre and truncated-cone-shaped at the edge. In said manner, the transition region between the side wall and the head of the blank 40 is applied against the forming die opening and forms a transition radius $R_1$ of 2 mm. The concavity $k_1$ of 8 mm is retained. The inside diameter of the forming die opening is 54.3 mm, i.e. the external dimension of the blank 40 is not altered.

Figure 11:
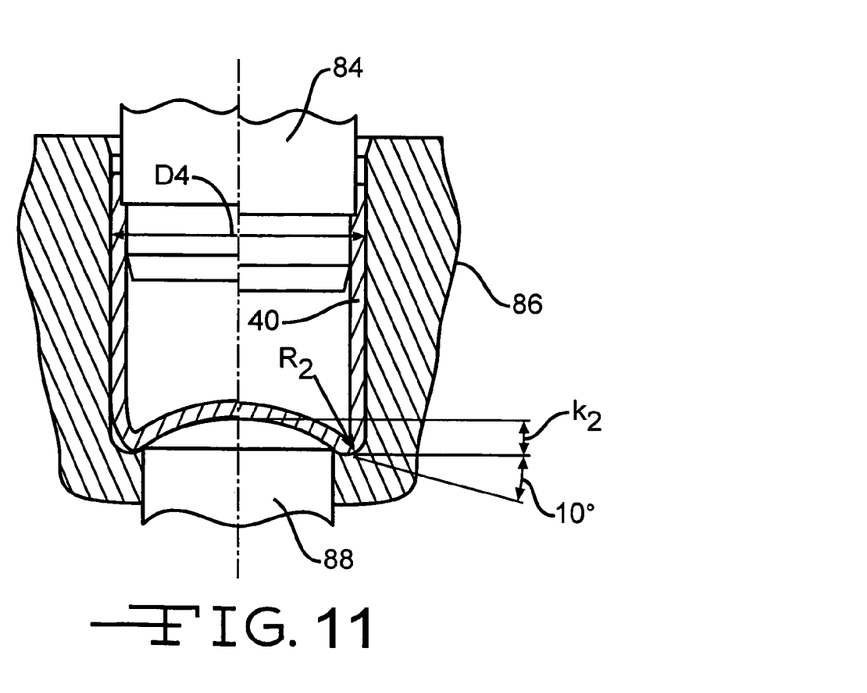

FIG. 11 shows a third stamping step, in which the head of the blank 40 receives its final shape. For this purpose, a step-shaped punch 84 designed for engagement with the shoulder 41 in the blank 40 presses the blank 40 into the opening of a bottom forming die 86, the base of which is formed by a punch-shaped ejector 88. By means of the ejector 88 the concavity is increased to a value $k_2$ of 9 mm. The spherical-cap-shaped configuration of the head of the blank in the centre, and the truncated-cone-shaped configuration of the head at the edge is in said case retained. The transition radius between the side wall and the head of the blank 40 increases to a value $R_2$ of 3.4 mm.

Figure 12:
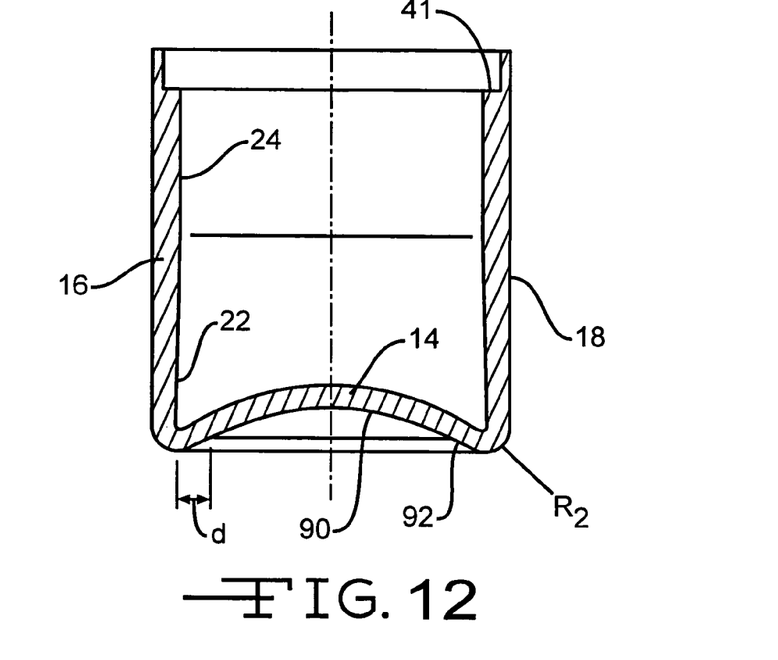

FIG. 12 shows the almost finished hydraulic piston as a blank in longitudinal section. It is possible to see the cylindrical portion 24 of the inner surface 22, the side wall thickness decreasing continuously from the portion 24 to the head 14, a central region 90 of the head 14 with a spherical-cap-shaped configuration, and a truncated-cone-shaped edge region 92 of the head 14 that extends over a distance $d$, which is not greater than three times the value of wall thickness of the side wall 16 in the vicinity of the head 14. Neither the inner surface 22 nor the cylindrical outer surface 18 require further machining.

To complete the hydraulic piston 10, the part of the side wall 16 forming the step or shoulder is removed (see FIG. 13) and the annular groove 20 is worked into the outer surface 18, e.g. by cutting.

Usually, at least the outer surface 18 of the hydraulic piston 10 is subsequently machined after forming the annular groove 20. The subsequent machining may comprise e.g. a grinding operation as well as subsequent coating with a corrosion- and abrasion-resistant material. The coated outer surface 18 may then be subjected to a polishing operation.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Cup-shaped hydraulic piston made from rolled sheet metal, comprising
    an open end,
    a side wall with a cylindrical outer surface and an inner surface, wherein the side wall at its outer surface is provided with an annular groove in a portion adjoining the open end, and
    a piston head,
    wherein a portion of the inner surface of the side wall adjoining the open end and extending in axial direction over the annular groove has a cylindrical shape, and wherein the thickness of the side wall decreases monotonically from the portion of the inner surface up to the piston head.

2. Hydraulic piston according to claim 1, wherein the piston head is curved inwards.

3. Hydraulic piston according to claim 2, wherein the piston head is curved in a concave manner.

4. Hydraulic piston according to claim 2, wherein a radially outer part of the piston head has the shape of a truncated cone and a central part of the piston head has the shape of a spherical cap.

5. Hydraulic piston according to claim 4, wherein an extension of the truncated-cone-shaped part of the piston head along its profile is not greater than three times a wall thickness of the side wall in its portion adjoining the piston head.

6. Method of manufacturing a hydraulic piston comprising the steps:
    punching a disk-shaped round blank out of a piece of rolled sheet metal;
    deep-drawing the disk-shaped round blank into a cup shape by means of a bottom die and a punch;
    stamping the cup-shaped blank to form a piston head and a cylindrical outer surface of the hydraulic piston; and
    incorporating an annular groove into an outer surface of the hydraulic piston;
    whereby said stamping step forms a portion of an inner surface of a side wall of the hydraulic piston adjoining an open end thereof and extending in axial direction over the annular groove to have a cylindrical shape, and whereby a said deep-drawing step forms the side wall to have a thickness that decreases monotonically from the portion of the inner surface up to the piston head.

7. Method according to claim 6, wherein the disk-shaped round blank during deep-drawing into a cup shape is pressed firstly by means of a first punch through a first circular die opening and then by means of a second punch through a second circular die opening, a diameter of which is smaller than a diameter of the first die opening.

8. Method according to claim 7, wherein the first punch and the second punch are cylindrical.

9. Method according to claim 7, wherein the cup-shaped blank is pressed by means of a third punch through a third circular die opening, a diameter of which is smaller than the diameter of the second die opening, wherein the third punch has a first cylindrical portion emanating from its free end and adjoined by a second cylindrical portion, a diameter of which is greater than the diameter of the first cylindrical portion and smaller than the diameter of the third die opening, in order to form a step in the side wall at the open end of the blank.

10. Method according to claim 9, wherein subsequent to deep-drawing into a cup shape a first stamping operation is effected to form an inwardly curved piston head in that a step-shaped punch comes into engagement with the step in the side wall of the blank and presses the blank into a bottom forming die.

11. Method according to claim 10, wherein subsequent to the first stamping operation the cup-shaped blank is pressed by means of another step-shaped punch, which comes into engagement with the step in the side wall of the blank, through a fourth circular die opening, a diameter of which is smaller than the diameter of the third die opening, in order to form the cylindrical outer surface of the side wall.

12. Method according to claim 11, wherein subsequent to forming of the cylindrical outer surface of the side wall a second stamping operation is effected by means of another bottom forming die and a further step-shaped punch, which comes into engagement with the step in the side wall of the blank, in order to form a transition region between the piston head and the side wall.

13. Method according to claim 12, wherein a region of the bottom die touching the piston head is cap-shaped in a centre and truncated-cone-shaped at an edge.

14. Method according to claim 12, wherein subsequent to forming of the transition region between the piston head and the side wall a third stamping operation is effected by means of a further bottom forming die and yet another step-shaped punch, which comes into engagement with the step in the side wall of the blank, in order to form the final configuration of the piston head.

15. Method according to claim 6, wherein subsequent to forming of the annular groove at least the outer surface is subsequently machined, wherein the subsequent machining comprises at least one of the following steps:

grinding;

coating; and polishing.

* * * * *

UNITED STATES PATENT AND TRADEMARK OFFICE
CERTIFICATE OF CORRECTION

PATENT NO. : 7,000,526 B2  Page 1 of 1
APPLICATION NO. : 10/767832
DATED : February 21, 2006
INVENTOR(S) : Bennett et al.

It is certified that error appears in the above-identified patent and that said Letters Patent is hereby corrected as shown below:

Col 8 line 65
After "whereby" delete "a".

Signed and Sealed this

Fourteenth Day of November, 2006

JON W. DUDAS
*Director of the United States Patent and Trademark Office*